June 4, 1963  D. B. GERDEMAN  3,092,403
SYMMETRICAL COUPLING HAVING INTERLOCKING LUGS
Filed Nov. 25, 1959  2 Sheets-Sheet 1
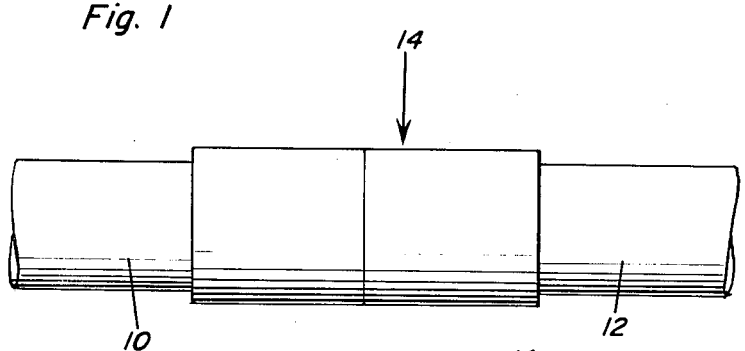
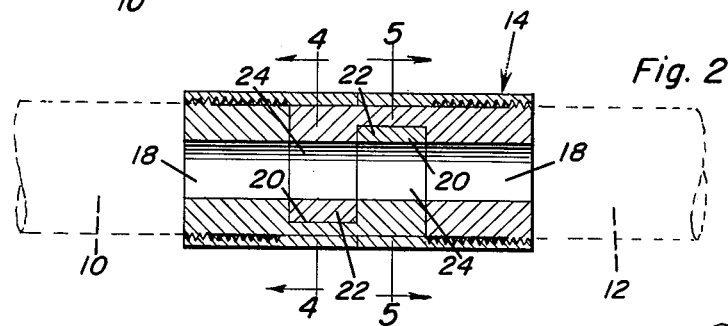
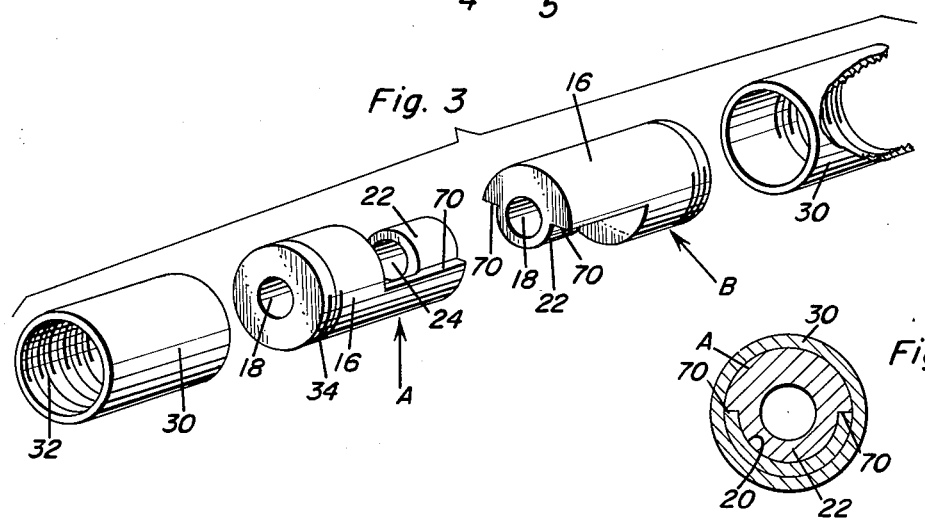
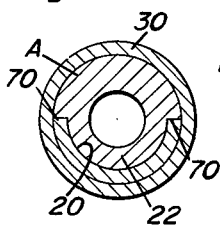
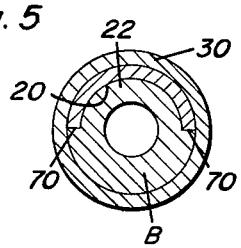
Dale B. Gerdeman
INVENTOR.

June 4, 1963  D. B. GERDEMAN  3,092,403
SYMMETRICAL COUPLING HAVING INTERLOCKING LUGS
Filed Nov. 25, 1959  2 Sheets-Sheet 2
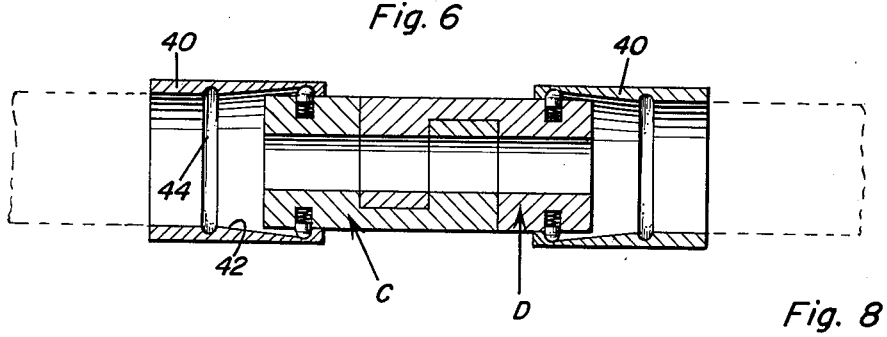
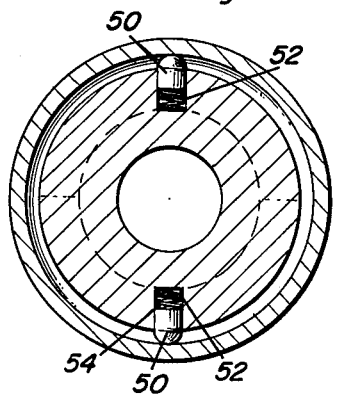
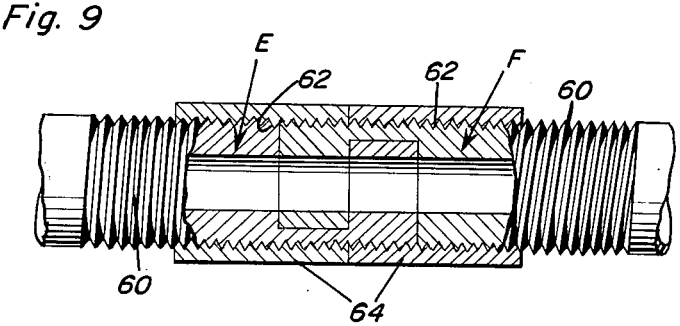
Dale B. Gerdeman
INVENTOR.

United States Patent Office 3,092,403
Patented June 4, 1963

3,092,403
SYMMETRICAL COUPLING HAVING INTERLOCKING LUGS
Dale B. Gerdeman, 1041 5th St., Las Vegas, N. Mex.
Filed Nov. 25, 1959, Ser. No. 855,343
10 Claims. (Cl. 285—86)

This invention comprises a novel and useful symmetrical coupling and more particularly relates to a coupling for detachably connecting together various types of hose, pipe, or other articles which it is desired to place in communication with each other.

The primary object of this invention is to provide a high strength, light weight, quick acting coupling of symmetrical design, that is, comprising a pair of identical units adapted to be engaged together to constitute the detachable coupling.

A further object of the invention is to provide a symmetrical coupling of very simple construction together with improved means for releasably securing the coupling components in their coupled or engaged relation.

A further and more specific object of the invention is to provide a symmetrical coupling in which a pair of identical coupling components may be interengaged by a single lateral movement relative to each other, and when engaged will be positively prevented from disengagement by longitudinally applied stresses thereto.

A still further object of the invention is to provide a symmetrical coupling in accordance with the foregoing objects wherein either or both of the components shall have mounted thereon in a very compact manner a locking means in the form of a sleeve which is movable longitudinally of the component to enclose the interengaging elements of the components and thus prevent their accidental separation.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a side elevational view of a symmetrical coupler in accordance with the present invention shown in the engaged position of the coupling components;

FIGURE 2 is a view in vertical longitudinal section through the coupling device of FIGURE 1, the conduits to which the coupling components are attached being shown by phantom lines therein;

FIGURE 3 is an exploded perspective view of the coupling components of FIGURE 2;

FIGURES 4 and 5 are horizontal sectional views taken substantially upon the plane indicated by the section lines 4—4 and 5—5, respectively, of FIGURE 2;

FIGURE 6 is a view in central longitudinal section through the modified construction of a symmetrical coupling in accordance with the invention, the parts being shown in their coupled position and with the conduits or pipes to which the coupling components are connected being shown in phantom therein;

FIGURE 7 is a view similar to FIGURE 6 but showing the position of the locking means in the locking position of the coupler;

FIGURE 8 is a vertical transverse sectional view taken upon a large scale substantially upon the plane indicated by the section line 8—8 of FIGURE 7 and showing a resilient detent forming a part of the locking means for the coupler assembly; and FIGURE 9 is a view in central longitudinal section through a modified construction of the coupler locking means.

Referring first to the embodiment illustrated in FIGURES 1–5, it will be observed that the coupling is shown applied to the ends of a pair of sections of hose, pipe, or other members 10 and 12 to be placed in communication with each other. The coupling is designated generally by the numeral 14. As shown in FIGURE 2 and in the exploded perspective view of FIGURE 3, the coupling consists of a pair of complementary and preferably identical components which are designated generally by the letters A and B. Inasmuch as the components are identical in the arrangements illustrated in these drawings, the same reference numerals are applied to the same elements of each of these components.

Each of the components A and B consists of a tubular cylindrical body designated by the numeral 16 and having a central axial bore 18 extending therethrough. At what may be termed the outer ends of the components, the exterior surface of the body is cylindrical, being smooth and uniform and is circular in cross-section. At the forward or inner ends of the components, the bodies are laterally cut away from one side thereof to provide a semi-cylindrical recess or seat 20 therein, and outwardly from this seat the forward ends of the bodies terminate in an integral lug 22. The bore or passage 24 extending through the lug is of course in alignment with the bore 18 through the unbroken portion of the body.

This position of the lug and the recess is such that, as suggested in FIGURE 2, the two components may be engaged whereby the lug of one will be received snugly and seat in the recess 20 of the other component, with the bores 18 and 24 being all aligned to form a continuous passage through the connected coupling.

By this arrangement, the two coupling components can be moved into and out of their engaged positions only by a lateral movement of the components with respect to each other, the endwise abutting engagement of the lugs with each other preventing an axial movement of the components away from each other, while the engagement of the lug of one component with the uncut body portion of the other component will prevent axial movement of the components towards each other.

Locking means are provided carried by at least one of the components, and movable thereon between a retracted or unlocked position and an advanced or locked position whereby to selectively unlock or lock the components. In the arrangement shown in FIGURE 1 and FIGURES 1–5, each component is illustrated as having a locking means in the form of a sleeve 30 which snugly embraces each component and which is internally threaded as at 32 for screw threaded engagement upon the threaded extremity 34 of its component. The arrangement is such that when either of the locking sleeves is advanced outwardly of its component by rotating the same, its forward end will move into a position overlying the recess of its component, and therefore will retain in this recess the engaged lug of the other component. Where two sleeves are employed, they may be caused to abut each other as shown in FIGURE 2, and by the pressure applied to their threaded engagement with their components will thus in turn lock each other into locked position upon their components.

In FIGURES 6–8 there is disclosed a similar construction of a coupling in accordance with the invention. In this embodiment, the two components C and D are of the same construction as the components A and B except that a different locking means is employed. Consequently, the structure and operation of these components will be readily understood and need not be repeated. However, in place of the locking sleeves 30 which screw threadedly engage the components A and B, there are provided locking sleeves 40 which are freely slidable upon their respective components. In this arrangement, each locking sleeve is provided from its forward end to a point rearwardly of its midportion with an internal conical tapered surface, as at 42, this surface merging into a circumferentially extending groove or channel 44. At the forward end, the sleeve is provided with an inturned ring or flange 46, thus providing an annular stop surface, as at 48, with which the tapered surface 42 merges.

The channel 44 and the surface 48 comprise stop means which limit the axial sliding movement of the locking sleeve from its unlocked position shown in FIGURE 6 to its locked position shown in FIGURE 7.

As shown in FIGURES 7 and 8, there are provided locking detent members 50 each slidably received in a recess or chamber 52 provided in the exterior cylindrical surface of the solid portion of the component C or D. A compression spring 54 in this chamber serves to resiliently urge the detent members outwardly therefrom and into contact with the interior surface of the sleeve. The arrangement is such that the detents will be urged into engagement with the stop surfaces 48 or 44 as shown in FIGURES 6 and 7, to thus selectively retain the locking sleeves in their unlocked or locked positions. Owing to the conical tapered surface 42, the thrust of the detent members 50 thereagainst under the influence of the springs 54 may, if desired, be such as to impart a slight outward axial thrust to the sleeves and thus yieldingly urge them into their unlocked position once the detent members have been disengaged from their locking channel 44.

In the arrangement of FIGURES 1–5, the threaded portion 34 upon the components A and B consists of a raised thread at the outward end portion only thereof, with the threads 32 of the sleeve 30 being engaged therewith.

In the modified construction of FIGURE 9, it is also possible to form the exterior surface of the components E and F along their entire length with threads 60 which are cut into the surface of the components in order that the corresponding internal threads 62 of the two locking sleeves 64 may engage therewith. Except for this distinction, the construction of the locking means and of the components E and F is identical with that of the components A and B.

At this point it should be observed that all of the locking components A through F, inclusive, are preferably provided upon opposite sides of the lug 22 with a pair of longitudinally extending shoulders 70. The shoulders 70 extend from opposite sides of the lug 22 from the front or forward end thereof to the solid portion of the body 16 and the shoulders of the two components of a coupling are complementary to and abuttingly engage each other to prevent rocking of the components once they are assembled together. The effect and relation of these shoulders will be apparent from a comparison of FIGURES 4 and 5.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A coupling for a pair of fluid conduits, said coupling consisting of a pair of like complementary components each having means at one end to be secured to one end of one of said conduits, each component comprising a unitary tubular cylindrical body including a main body portion having an axial opening therethrough and a radially thick wall, a connecting portion having in part the same wall thickness as said main body portion and having diametrically opposed radially and axially extending shoulders, a first arcuate surface portion having the same radius as the radius of the outer surface of the body portion and joining said shoulders at their outer extent and continuous with the axial length thereof, a second arcuate surface portion at the outer end of said connecting portion diametrically opposed to said first arcuate surface portion and concentric therewith, an opening concentric with both said surfaces having a smaller radius than said second arcuate surface and extending axially the full length of said second surface and axially aligned with the opening in said main body portion, said second arcuate surface joining the radially inner edge of said shoulders and extending one half of the axial extent thereof and forming an apertured lug at said outer end of said connecting portion, the inner surface of said lug being spaced from said main body portion and defining with the inner wall thereof a radially and axially extending recess of one half the axial length of said shoulders, the radial inner surface defining said recess being arcuate and of the same radius as that of said second arcuate surface whereby the lug of one component will be received in and fill the recess of the other component and will provide when assembled therewith a smooth cylindrical exterior surface for said components in their engaged relation, with the openings in the lugs aligned with and forming continuations of the aligned openings through said components, locking means surrounding and movable longitudinally upon at least one of said components and slidably engaging the exterior surface of the latter and movable between a retracted, unlocked position uncovering the lug of the other component and an advanced locked position overlying the lug of said other component.

2. The combination of claim 1 wherein said recess opens through one side of its component whereby relative lateral movement of the pair of components is necessary to effect entry of a lug into a recess and its withdrawal therefrom.

3. The combination of claim 1 wherein said locking means comprises a sleeve.

4. The combination of claim 3 including a pair of sleeves each movably mounted on a component.

5. The combination of claim 4 including means retaining said sleeves selectively in unlocked and locked positions.

6. The combination of claim 1 wherein said locking means comprises a pair of sleeves each movably mounted upon and surrounding one of said components.

7. The combination of claim 6 including means retaining said sleeves selectively in unlocked and locked positions.

8. The combination of claim 1 including a screw threaded connection between said locking means and its component.

9. The combination of claim 1 including an axially slidable connection between said locking means and its component.

10. The combination of claim 1 wherein said locking means comprises a sleeve slidably mounted upon its component, a detent member carried by said component and projecting resiliently from the latter into engagement with said sleeve, the latter having longitudinally spaced stop means engageable by said detent member.

References Cited in the file of this patent

UNITED STATES PATENTS

| | | |
|---|---|---|
| 283,771 | Genin | Aug. 28, 1883 |
| 444,676 | Shull | Jan. 13, 1891 |
| 510,353 | Long | Dec. 5, 1893 |
| 1,189,802 | Eckert | July 4, 1916 |
| 1,285,543 | Yarnell et al. | Nov. 19, 1918 |
| 1,975,244 | Wiseman | Oct. 2, 1934 |
| 2,257,321 | Arnold | Sept. 30, 1941 |
| 2,548,089 | Wycosky | Apr. 10, 1951 |
| 2,890,066 | Kerr | June 9, 1959 |